Patented Mar. 6, 1945

2,371,002

UNITED STATES PATENT OFFICE 2,371,002

WHOOPING COUGH ENDOTOXIN

Lyon Peter Strean, Montreal, Quebec, Canada, assignor, by mesne assignments, to Ayerst, McKenna & Harrison (United States) Limited, Rouses Point, N. Y., a corporation of New York No Drawing. Application April 19, 1941, Serial No. 389,461. In Canada April 22, 1940

7 Claims. (Cl. 167—78)

This invention relates to a useful biological product having the characteristics of an endotoxin specific to whooping cough (*Haemophilus pertussis*) to its preparation, and to allied substances and their preparation.

Whooping cough is today recognized by public health authorities as causing a greater proportion of infant fatalities, in America, than any other disease. This is probably due to the fact that there has been little progress in specific treatment and in detecting susceptibility for whooping cough, whereas efficient methods have been made available for most infectious diseases. While there are fairly satisfactory methods capable of immunizing a large proportion of children susceptible to whooping cough, the mortality rate of this disease is highest at the fifth month, and immunization of infants under six months of age is fraught with considerable danger.

It is thus most desirable to know, in advance, the immunological state of infants so that those already immune and likely to react dangerously will not be inoculated. It is also desirable, in the event of epidemics, to know what children are immune so that they will not have to be quarantined.

To determine immunity to other diseases, substances have been developed, which can be applied in simple skin tests. While investigation of pertussis has gone on for a considerable period, there is no indication that there has been offered a product suitable for use as a practical skin test specific to this disease. The contributions to the field have been principally in the nature of bacterial vaccines for active immunity which have, for their purpose, produced fairly reliable and successful results, but they are not applicable to skin tests.

OBJECTS

Having regard to the foregoing, it is one of the principal objects of the present invention to provide a toxic substance specific to whooping cough, which can be used in a skin test for determining the immunological state of a subject. Another important object of the invention is to provide substances of an allied nature, which may be used for active and passive immunity. Another object is to provide convenient and practical processes for producing these substances.

PREPARATION OF THE PRODUCT

Considerable experimentation, on the applicant's part, led to the belief that there was present in *Haemophilus pertussis* a substance having the characteristics of an endotoxin specific to the disease and that serologically this endotoxin had certain useful applications, among which was its aptness for use in a practical skin test on human beings for the determination of their immunological state. Owing to the nature of *Haemophilus pertussis*, difficulty was experienced, at first, in obtaining a substance satisfying the necessary criteria and sufficiently stable for practical application.

Eventually, I evolved methods of obtaining a product having the desired qualities. In one method, *H. pertussis*, phase I, was cultured on a suitable medium. After incubation, the culture was suspended in physiological saline and the suspension frozen and thawed a number of times. The suspension was then dried, in vacuo, to concentrate the electrolyte, after which this dried material was resuspended in distilled water, allowed to stand for a period, and then centrifuged. The supernatant liquid thus obtained contained an active water soluble extract having the characteristics of an endotoxin specific to pertussis.

In another method, which was found even more efficient, the culture was first washed and was then suspended in hypertonic (as compared with physiological) saline. It was then subjected to the freezing and thawing steps.

To exemplify the reference to *Haemophilus pertussis* phase I, it should be mentioned that *Haemophilus pertussis* after isolation from the human subject may pass through various phases as described by Leslie and Gardner (J. Hygiene 31:423 (1931)). These phases are designated I, II, III and IV of which phase I is the smooth, virulent phase as is found in recently isolated cultures; phase IV is the rough avirulent phase; and phase II and III are considered as intermediates.

USE IN A SKIN TEST

This active extract, in high dilution, is lethal for mice, produces dermonecrosis in the skin of rabbits or guinea pigs. Also in high dilution, it produces an erythematous patch in children not immune to pertussis, without the slightest allergic reaction. Moreover, the substance is quite stable, retaining its toxic effect for months when kept at 4.0° C.

Sodium ethylmercuri-thio-salicylate 1 in 10,000 has been found to be a satisfactory preservative (to prevent bacterial growth) for the endotoxin, in that it does not destroy its toxicity.

EXAMPLES

Now that the nature of the invention has been outlined and in order that it may be understood in a more specific sense, actual examples will be given, as follows, of actual procedures which are specific embodiments of the invention. It will be understood that the data given in these examples is furnished only for illustrative purposes and not to be taken in a limiting sense.

EXAMPLE 1

"Bordet-Gengou" medium, modified by the addition of 1.5% dialyzed "Difco" proteose peptone, was poured into six small Petri dishes, with each dish measuring approximately 9.6 square inches area x 0.25 inch thickness. The medium of all plates was streaked with the freshly-isolated bacteria, which satisfied biologically and serologically the criteria of Haemophilus pertussis phase I. The plates were incubated aerobically for 72 hours at 37° C. and confluent growth thus obtained. The culture of the plates, estimated to include on an average $50 \times 10^{10}$ bacteria per plate, was then scraped, washed in saline and suspended in 30 c. c. hypertonic saline in a centrifuge bottle. The suspension was frozen in carbon dioxide snow and methyl Cellosolve (—70° C.) and then allowed to thaw in a water bath at 37° C., the freezing and thawing being repeated ten times. The frozen suspension was then dried for about 8 hours, in vacuo, over phosphorus pentoxide ($P_2O_5$), leaving a dried mass of a brownish colour adhering to the bottle. After that time, the dried mass was resuspended in 30 c. c. sterile distilled water, shaken for 30 minutes and then kept in the cold (at 4.0° C.) for 24 hours. The material was centrifuged at high speed and the supernatant liquid separated. The supernatant liquid thus obtained was of a pale yellowish colour and was found to contain a water soluble extract having the characteristics of an endotoxin specific to pertussis, determined as set forth in the following Examples 3, 4 and 7.

Precipitation of the endotoxin is effected by using 2% acetic acid, precipitating the endotoxin at a pH of 4.2. The assay gave total solids 11.13 mg./cc. of which about 10% was precipitable material containing the endotoxin. This precipitated endotoxin can be reconstituted at a pH of 7, at which point it goes into solution readily. These endotoxin solutions gave precipitates with excess ethyl alcohol, with 1% sulphosalicylic acid and with 5% trichloracetic acid. No coloration was produced with dilute iodine solution.

Micro-nitrogen determinations (Kjeldahl) for three different preparations of the endotoxin solution gave the following figures: 0.203, 0.142 and 0.162 mg. The endotoxin solution also contained 0.06 mg. of hydrolysable phosphorus per cc.

The purified endotoxin (15.6 mg.) from 130 cc. of the crude endotoxin preparation was redissolved in water at pH 7.0 to give a clear slightly yellow colored solution. This solution gave a white precipitate with 5% trichloracetic acid or with an excess of alcohol, and positive Biuret, Millon's, Hopkins-Cole and xanthoproteic tests were obtained.

These results indicate the protein characteristics of the precipitate and the presence of tyrosine and of tryptophane.

Glycuronic acid (0.6%) was present in acid hydrolysates of purified endotoxin preparations (boiling 3.5 N. HCl for 3½ hours), as determined by the method of Maughan, Evelyn and Browne Journal of Biological Chemistry, 126:567 (1938). The sugar content (calculated as glucose) was 3.4%, of which approximately half was present as "fermentable sugar."

EXAMPLE 2

A procedure was carried out similar to that of Example 1 with the exception of the freezing and thawing step. In this instance, the suspension was frozen slowly in ice and salt and then allowed to thaw in a water bath at 37° C. The freezing and thawing was repeated three times. The suspension was then treated as in Example 1, with the result that a supernatant liquid was obtained containing an active water soluble extract having the characteristics of an endotoxin specific to Haemophilus pertussis, determined as in the following Examples 3, 4 and 7. The supernatant liquid was of a pale yellowish colour, was not dialyzable, nor filtrable through a Seitz filter without a great loss in potency, but filtrable through a Jena 3 sintered glass filter.

EXAMPLE 3

The dried mass obtained from the drying step in Example 2 was suspended in 30 c. c. distilled water, kept in the cold (4.0° C.) for 24 hours and then centrifuged and the supernatant liquid separated. 1.0 c. c. of the supernatant liquid thus obtained, injected intraperitoneally killed white mice weighing 10 to 22 gms. within 18 hours. Before death, the mice became very bluish in colour, as if cyanosed. This was particularly visible in the mouse's tail.

Serial dilutions were made of the supernatant liquid containing the endotoxin and the mice were injected intraperitoneally each with 1.0 c. c. of the particular dilution tested. The results were as expressed in the following Chart 1.

CHART 1

| Dil. of endotoxin | Wt. in mg./cc. | 24 hours | | 48 hours | |
|---|---|---|---|---|---|
| | | D | S | D | S |
| Undiluted | 11.130 | 10 | 0 | 10 | 0 |
| ½ | 5.565 | 10 | 0 | 10 | 0 |
| ¼ | 2.783 | 10 | 0 | 10 | 0 |
| ⅛ | 1.392 | 10 | 0 | 10 | 0 |
| ⅟₁₆ | 0.696 | 7 | 3 | 9 | 1 |
| ⅟₃₂ | 0.348 | 0 | 10 | 0 | 10 |
| M. L. D. ⅟₁₀ | 1.113 | | | | |

In Chart 1 the first column expresses the dilution of the supernatant liquid, the second the weight in mg. per c. c. of the dried total solids containing the endotoxin present in the dilution. The third and fourth columns express the lethal effect of the respective doses on mice, D indicating "died" and S indicating "survived."

From the information given in this chart, it is found that when the dried mass containing the endotoxin was diluted 1:8, representing 1.392 mg. of endotoxin, all of the mice (10) died in 48 hours. When half of this amount i. e. 1–16 solution was given, 9 of 10 mice died in 48 hours while none of 10 mice died when the solution was diluted 1–32. Thus the minimal lethal dose for mice as established by experiment was 1.113 mg. of endotoxin or a dilution of 1:10. The equivalent of this dose contained in 0.2 c. c., when injected intradermally into rabbits or guinea pigs, produced inflammation purplish in colour within 8 hours, which was followed by necrosis after 96 hours. Dried organisms obtained after the drying step of Example 1 treated in exactly the same manner were found to produce substantially identical reactions.

EXAMPLE 4

The dried material taken after the drying step of Example 1 was suspended in 600 c. c. distilled water, kept in the cold for 24 hours, centrifuged, and the supernatant liquid separated. It was found that 0.1 c. c. of the supernatant liquid thus obtained injected intradermally into children whose histories were substantially negative to whooping cough, produced a skin reaction in the form of an erythematous patch averaging 1 to 3 cm. in diameter within 6 to 24 hours, which faded about 12 hours afterwards. Infants and children with case histories substantially positive to whooping cough reacted negatively to the test.

EXAMPLE 4A

In another example a procedure was carried out similar to that of Example 1, except that the harvested organisms were washed 3 times in saline before being resuspended in hypertonic saline, and then frozen and thawed 10 times.

EXAMPLE 5

30 c. c. of the substance (the supernatant liquid of Example 1) was kept in a flask at 4.0° C. and was tested as to biological activity once each month for four months. In each test the activity was maintained, in that the liquid was diluted 10 times and 1.0 c. c. injected intraperitoneally killed white mice in 18 hours and 0.2 c. c. produced characteristic necrotic lesions in the skin of a rabbit, $1/20$ minimal lethal dose for mice, injected intradermally, produced an erythematous patch in susceptible children. 30 c. c. of the supernatant liquid of Example 2 was similarly aged and tested with substantially identical results.

EXAMPLE 6

10 rabbits of the chinchilla or white type, each weighing 5 to 7 pounds, were injected subcutaneously by a series of increasing doses over a period of time, with pertussis endotoxin produced by the method of Example 1 and formalized with 0.4% formalin. The treated rabbits were given a rest period and then bled from the heart; the serum separated from the clotted blood contained the pertussis anti-endotoxin. Test tubes containing 20,000 millon pertussis phase I organisms as a suspension in 1.0 c. c. of saline failed to agglutinate in the presence of 1 c. c. of serum, in dilutions greater than 1/100, when incubated at 37° C. for 1 hour and overnight at 4° C. Normal rabbit serum frequently agglutinates *H. pertussis* phase I in a titre of 1/100. On the other hand this suspension agglutinated with serum obtained from another group of rabbits injected with *Haemophilus pertussis* phase I organisms in dilution of the serum up to 1/16,000.

CHART 2

The following chart is intended to indicate the neutralizing effect of pertussis antiendotoxin (0.5 cc. endotoxin solution (2 M. L. D.) + 0.5 cc. diluted antiendotoxin)*

| Antiendotoxin I | | Antiendotoxin II | |
| --- | --- | --- | --- |
| Dilution | Deaths in 10 days | Dilution | Deaths in 10 days |
| Undiluted | 0/10 | Undiluted | 0/10 |
| 1/2 | 0/10 | 1/2 | 0/10 |
| 1/4 | 0/10 | 1/4 | 0/10 |
| 1/8 | 10/10 | 1/8 | 0/10 |
| 1/16 | 10/10 | 1/16 | 0/10 |
| 1/32 | 10/10 | 1/32 | 0/10 |
| 1/64 | 10/10 | 1/64 | 10/10 |
| Toxin only (36 hrs.) | 10/10 | Toxin only (36 hrs.) | 10/10 |
| Anti-endotoxin only | 0/10 | Anti-endotoxin only | 0/10 |

* Endotoxin-antiendotoxin mixture kept at room temperature for 3 hours prior to the intraperitoneal injection of Chart 3 is designed to show the endotoxin neutralizing effect of pertussis anti-endotoxin. When 2 M. L. D. of endotoxin contained in 0.5 cc. mixed with 0.5 cc. of the anti-endotoxin serial dilutions were kept at room temperature for 3 hours and 1 cc. of this mixture injected intraperitoneally into mice, it was found that the anti-endotoxin could be diluted 32 times and still retain neutralizing value against 2 M. L. D. of endotoxin. The anti-endotoxin failed to completely neutralize 2 M. L. D. of endotoxin, in a dilution of 1:64. The mice were observed for 10 days. In the controls where 2 M. L. D. of endotoxin was given without protective anti-endotoxin, the mice died in 36 hours.

PROPERTIES OF THE PRODUCT

From the results of skin tests on human beings similar to those demonstrated by Example 4, it was found that $1/20$ of a minimal lethal dose for mice, as determined by the tests, served as a suitable standard for human use. Anything appreciably over this amount produced positive reactions in children whose histories were substantially positive to pertussis, whereas anything substantially under this amount, might produce negative reactions in children with histories substantially negative to pertussis. The great utility in this standardized form of the product, for use in skin tests, can readily be seen, in that its results are highly accurate. Serial dilution of the endotoxin as indicated by Chart 1, in conjunction with the clinical trial, enables the determination of the degree of susceptibility of a child to whooping cough. The product may be used quite safely in prescribed concentration.

Observations on children on which the skin test was performed, as for instance according to Example 4, indicated that there was no bacterial antigen reaction. This is believed to be due to the purity of the product, that is to say its freedom from bacteria or fragments thereof. This is made evident from tests, such as those of Example 6, where a suspension of *H. pertussis* organisms phase I failed to agglutinate with the anti-endotoxin at a titre higher than normal rabbit serum, whereas the same suspension agglutinated with a serum from rabbits immunized with the organisms at a titre of 1/16,000.

The stability of the endotoxin, demonstrated for instance in Example 5, makes possible the diagnostic use of the product on a large scale. It can be kept for long periods without unusual precautions.

PREPARATION

Regarding the preparation of the pertussis endotoxin, it is believed that the steps of repeated freezing and thawing, in combination with drying to concentrate the electrolyte and subsequent re-suspension in water, offers a particularly advantageous method for the isolation of the substance in the pure condition such that it has desired specific toxicity and wherein it may be used in a human skin test without undesirable reactions. The applicant's explanation of the success of this method, as opposed to others which were attempted, is that *Haemophilus pertussis* organisms are extremely resistant to deleterious agents and drastic treatment requiring the first step of repeated freezing and thawing to weaken the more resistant organisms and to kill the weaker ones, and the increased osmotic pressure produced by the re-suspension in water after drying to so modify the permeability of the membranes as to release an endotoxin.

IMMUNIZATION

It has also been found that the endotoxin prepared according to the invention may be detoxified with formalin to form an endotoxoid and injected into animals either subcutaneously or intranasally (or any other route known to produce the desired response) to produce a serum capable of neutralizing the effect of the endotoxin.

The use of the endotoxin for the preparation of antiendotoxin is further demonstrated by the following example.

EXAMPLE 7

An endotoxin obtained according to Example 1 was formalized with 0.4% formalin. The endotoxoid thus produced was injected subcutaneously into rabbits and subcutaneously into mice and found to be antigenic and to produce serum in these animals which would neutralize the effect of the endotoxin. Thus it was established that the endotoxoid can be used for active immunity against *Haemophilus pertussis* and the rabbit serum for passive immunity. A comparison of active immunization with *Haemophilus pertussis* phase I organisms and pertussis endotoxoid is found on the following Chart 3,

CHART 3

Immunized with—
- Group A—Killed *H. pertussis*
- Group B—Killed *H. pertussis*
- Group C—Pertussis endotoxoid
- Group D—Pertussis endotoxoid Tested with—
- 2 M. L. D.—Live *H. pertussis*
- 2 M. L. D.—Pertussis endotoxin
- 2 M. L. D.—Live *H. pertussis*
- 2 M. L. D.—Pertussis endotoxin

| Days | 1st | | 2nd | | 3rd | | 4th | | 5th | | 6th | | 7th | | 8th | | 9th | | 10th | | | |
|---|---|---|---|---|---|---|---|---|---|---|---|---|---|---|---|---|---|---|---|---|---|---|
| | D | S | D | S | D | S | D | S | D | S | D | S | D | S | D | S | D | S | D | S | D | S |
| Group A | 0 | 20 | 2 | 18 | 4 | 16 | 7 | 13 | 9 | 11 | 11 | 9 | 12 | 8 | 15 | 5 | 18 | 2 | 20 | 0 | | |
| Group B | 5 | 15 | 15 | 5 | 20 | 0 | | | | | | | | | | | | | | | | |
| Group C | 0 | 20 | 0 | 20 | 0 | 20 | 0 | 20 | 0 | 20 | 0 | 20 | 1 | 19 | 2 | 18 | 2 | 18 | 2 | 18 | | |
| Group D | 0 | 20 | 0 | 20 | 1 | 19 | 2 | 18 | 3 | 17 | 4 | 16 | 5 | 15 | 5 | 15 | 5 | 15 | 5 | 15 | | |
| *Controls* | | | | | | | | | | | | | | | | | | | | | | |
| H pertussis | 3 | 2 | 5 | 0 | | | | | | | | | | | | | | | | | | |
| Endotoxin | 5 | 0 | | | | | | | | | | | | | | | | | | | | |

N. B. Controls were not previously immunized.

Chart 3 shows the difference in degree of immunity produced in mice by active immunization with pertussis bacterial vaccine and pertussis endotoxoid. 4 groups of 20 mice each were given a series of injections: 2 groups receiving bacterial vaccine and the other 2 groups endotoxoid. These animals were challenged later with either 2 M. L. D. of live pertussis organisms or 2 M. L. D. of toxin.

It was found that in the group of 20 mice immunized with pertussis bacterial vaccine none of the mice survived at the end of ten days when challenged with 2 M. L. D. of living organs, whereas a similar group immunized with the same vaccine were all dead at the end of 48 hours when challenged with 2 M. L. D. of toxin. But in the group of mice immunized with pertussis endotoxoid 18 of 20 survived at the end of 10 days when challenged with 2 M. L. D. of live pertussis organisms while in the 4th group, also immunized with endotoxoid, 15 of 20 mice survived at the end of 10 days when challenged with 2 M. L. D. of toxin. The controls, which were not immunized previously, all died in 48 hours when given 2 M. L. D. of live *H. pertussis* organisms and in a similar group treated with 2 M. L. D. of toxin all died in 24 hours.

*Haemophilus pertussis* phase I organisms have been specified in the examples. This phase is known to be the most potent, but naturally other phases might be used with varying results.

It will also be understood that the above disclosure is intended in an illustrative sense and that various modifications may be made in the procedure outlined, to achieve results within the purview of the invention. It is intended that the scope of the patent be limited only by the state of the prior art and the scope of the following claims.

I claim:

1. A process for producing a substance having the characteristics of an endotoxin specific to pertussis, comprising, suspending *Haemophilus pertussis* organisms in a solution, freezing and thawing the suspension repeatedly, drying the suspension to concentrate the electrolyte, subsequently resuspending the dried organisms in sterile distilled water, then centrifuging the suspension and separating therefrom the supernatant liquid containing the active substance.

2. A process for producing a substance having the characteristics of an endotoxin specific to pertussis, comprising, suspending pertussis organisms in a saline solution, freezing and thawing the suspension repeatedly, drying the suspension to concentrate the electrolyte, subsequently resuspending the dried organisms in sterile distilled water, allowing the re-suspension to stand to effect extraction, then centrifuging the suspension and separating therefrom the supernatant liquid containing the active substance.

3. A process for producing a substance having the characteristics of an endotoxin specific for pertussis, which includes the steps of, suspending pertussis organisms in a saline solution, repeatedly freezing and thawing said suspension effectively to increase the permeability of the membranes of the organisms, drying the suspension to form a dried mass containing the organisms, and suspending said dried mass in water to release endotoxin by osmosis.

4. A process for producing a substance having the characteristics of an endotoxin specific for pertussis, which includes the steps of, suspending pertussis organisms in a saline solution, repeatedly freezing and thawing said suspension effectively to increase the permeability of the membranes of the organisms, drying the suspension to form a dried mass containing the organisms, suspending said dried mass in water to release endotoxin, and separating said suspension into soluble and insoluble fractions.

5. An endotoxin derived from *Haemophilus pertussis*, which is capable of producing dermonecrosis in susceptible animals, is lethal for mice, is capable of producing only a specific skin reaction when injected intradermally in suitable doses into susceptible human beings, is incapable of producing agglutinins to *Haemophilus pertussis* in rabbits injected therewith, is incapable after detoxification of producing more than the agglutinins to *Haemophilus pertussis* usually present in normal rabbit serum, is protein in nature, gives no coloration with dilute iodine, contains phosphorus, tyrosine, tryptophane, glycuronic acid and sugar, is precipitable with 2% acetic acid in the cold at a pH of 4.2 to form a precipitate capable of being reconstituted readily in ice cold normal saline at a pH of 7, is low in nitrogen, and loses potency when passed through a Seitz filter.

6. An antigenic endotoxoid specific to *Haemophilus pertussis* capable of producing an immunological response and being an endotoxin having the characteristics of the product of claim 5 detoxified by formalin.

7. An antiendotoxic serum containing antibodies specific against *Haemophilus pertussis* endotoxin derived from a suitable animal immunized by a formalized endotoxin having the characteristics of the product of claim 5.

LYON PETER STREAN.